United States Patent
Wang et al.

(10) Patent No.: US 6,980,594 B2
(45) Date of Patent: Dec. 27, 2005

(54) GENERATION OF MPEG SLOW MOTION PLAYOUT

(75) Inventors: Jie Wang, L'Haÿ les Roses (FR);
Michel Noury, Villebon sur Yette (FR);
Daniel Gardere, Montigny-le-Bretonneux (FR);
Sebastien Keller, Paris (FR); Sorin Faibish, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 757 days.

(21) Appl. No.: 09/951,853

(22) Filed: Sep. 11, 2001

(65) Prior Publication Data

US 2003/0053540 A1    Mar. 20, 2003

(51) Int. Cl.⁷ .............................................. H04N 7/12
(52) U.S. Cl. .................................. 375/240.12; 386/68
(58) Field of Search .................. 375/240.24, 240.26, 375/240.03, 240.12; 382/232; 386/68, 69, 386/120, 121

(56) References Cited

U.S. PATENT DOCUMENTS

| | | | |
|---|---|---|---|
| 5,231,484 A | 7/1993 | Gonzales et al. | 358/133 |
| 5,231,487 A | 7/1993 | Hurley et al. | 375/240.01 |
| 5,381,144 A | 1/1995 | Wilson et al. | 341/63 |
| 5,534,944 A | 7/1996 | Egawa et al. | 348/584 |
| 5,565,998 A | 10/1996 | Coombs et al. | 386/46 |
| 5,675,384 A | 10/1997 | Ramamurthy et al. | 348/405 |
| 5,691,770 A | 11/1997 | Keesman et al. | 375/240.04 |
| 5,694,170 A | 12/1997 | Tiwari et al. | 348/390 |
| 5,793,897 A | 8/1998 | Jo et al. | 385/246 |
| 5,812,788 A | 9/1998 | Agarwal | 709/247 |
| 5,838,678 A | 11/1998 | Davis et al. | 370/389 |
| 5,859,660 A | 1/1999 | Perkins et al. | 348/9 |
| 5,892,548 A | 4/1999 | Kim | 375/240.04 |
| 5,892,915 A | 4/1999 | Duso et al. | 395/200.49 |
| 5,917,830 A | 6/1999 | Chen et al. | 370/487 |
| 5,959,690 A | 9/1999 | Toebes, VIII et al. | 348/578 |
| 5,969,650 A | 10/1999 | Wilson | 341/67 |
| 6,038,000 A | 3/2000 | Hurst, Jr. | 348/845 |
| 6,052,384 A | 4/2000 | Huang et al. | 370/468 |
| 6,061,399 A | 5/2000 | Lyons et al. | 375/240 |
| 6,101,195 A | 8/2000 | Lyons et al. | 370/498 |
| 6,141,358 A | 10/2000 | Hurst et al. | 370/543 |
| 6,154,496 A | 11/2000 | Radha | 375/240.28 |
| 6,198,773 B1 * | 3/2001 | Gill et al. | 375/240.26 |

(Continued)

OTHER PUBLICATIONS

Seyfullah H. Oguz, Sorin Faibish, and Wayne W. Duso, "Efficient Scaling of Nonscalable MPEG-2 Video," U.S. Appl. No. 09/608,050, filed Jun. 30, 2000, allowed Apr. 2, 2004.

(Continued)

*Primary Examiner*—Gims Philippe
(74) *Attorney, Agent, or Firm*—Richard C. Auchterlonie; Novak Druce & Quigg, LLP.

(57) ABSTRACT

MPEG coded video data includes groups of pictures (GOPs). Each group of pictures includes one or more I-frames and a plurality of B- or P-frames. To produce an MPEG slow-forward coded video stream, the coding type of each frame in the MPEG coded video data is identified, and freeze frames are inserted as a predefined function of the identified coding type and as a predefined function of a desired slow down factor. In a preferred implementation, for a slow-down factor of n, for each original I- or P-frame, (n−1) backward-predicted freeze frames are inserted, and for each original B-frame, (n−1) copies of the original B-frames are added, and a selected amount of padding is added to each copy of each original B-frame in order to obtain a normal play bit rate and avoid video buffer overflow or underflow.

20 Claims, 8 Drawing Sheets

U.S. PATENT DOCUMENTS

| | | | |
|---|---|---|---|
| 6,263,021 B1 | 7/2001 | Sethuraman et al. ... | 375/240.03 |
| 6,330,286 B1 | 12/2001 | Lyons et al. ........... | 375/240.28 |
| 6,414,998 B1 | 7/2002 | Yoshinari et al. ...... | 375/240.25 |
| 6,459,811 B1 * | 10/2002 | Hurst, Jr. .................... | 382/232 |
| 6,480,547 B1 | 11/2002 | Chen et al. ............ | 375/240.27 |
| 6,678,332 B1 | 1/2004 | Gardere et al. ........ | 357/240.26 |
| 6,771,703 B1 * | 8/2004 | Oguz et al. ............ | 375/240.03 |
| 6,792,047 B1 * | 9/2004 | Bixby et al. ........... | 375/240.26 |
| 2001/0036355 A1 | 11/2001 | Kelly et al. .................... | 386/52 |
| 2002/0087976 A1 | 7/2002 | Kaplan et al. ................. | 725/34 |
| 2002/0154694 A1 | 10/2002 | Birch .................... | 375/240.05 |
| 2002/0172281 A1 | 11/2002 | Mantchala et al. .... | 357/240.12 |
| 2003/0021346 A1 | 1/2003 | Bixby et al. ........... | 357/240.25 |

OTHER PUBLICATIONS

Seyfullah H. Oguz, Sorin Faibish, and Wayne W. Duso, "Efficient Scaling of Nonscalable MPEG-2 Video", U.S. Appl. No. 09/608,050, filed Jun. 30, 2000 (95 pages text, 24 sheets drawings, 2 pg. declaration).

Seyfullah H. Oguz, Sorin Faibish, Daniel Gardere, Michel Noury, Wayne W. Duso, Peter Bixby, and John Forecast, "Processing of MPEG Encoded Video for Trick Mode Operation," U.S. Appl. No. 09/608,919, filed Jun. 30, 2000 (93 pages text, 24 sheets drawings, 8 pg. declarations).

Y. Nakajima, H. Hori, and T. Kanoh, "Rate Conversion of MPEG Coded Video by Re-quantization Process," IEEE Proc. of ICIP-95, vol. III, Sep. 1995, pp. 408-411.

A.T. Erdem and M.I. Sezan, "Multi-generation Characteristics of the MPEG Video Compression Standards," IEEE Proc. of ICIP-94, vol. II, 1994, pp. 933-937.

M. Perreira, and A. Lippman, "Re-codable video," IEEE Proc. of ICIP-94, vol. II, 1994, pp. 952-956.

M. Mohsenian, R. Rajagopalan, and C.A. Gonzales, "Single-pass constant- and variable-bit-rate MPEG-2 video compression," IBM J. Res. Develop., vol. 43, No. 4, Jul. 1999, pp. 489-509.

P.H. Westerink, R. Rajagopalan, and C.A. Gonzales, "Two-pass MPEG-2 variable-bit-rate encoding," IBM J. Res. Develop., vol. 43, No. 4, Jul. 1999, pp. 471-488.

Jill Boyce, John Henderson, and Larry Pearlstein, "An SDTV Decoder with HDTV Capability: An All-Format ATV Decoder," Hitachi America Ltd., file://C:Fatima\67.gif, pp. 67-75, published at least as early as Jan. 12, 2000.

Boon-Lock Yeo, "On fast microscopic browsing of MPEG-compressed video," IBM T.J. Watson Research Center, Jan. 1998, Multimedia Systems 7, 1999, pp. 269-281.

Robert Mokry and Dimitris Anastassiou, "Minimal Error Drift in Frequency Scalability for Motion-Compensated DCT Coding," IEEE Transactions on Circuits and Systems for Video Technology, vol. 4, No. 4, Aug. 1994, pp. 392-406.

C. Ward, C. Pecota, X. Lee, and G. Hughes, "Seamless Splicing for MPEG-2 Transport Stream Video Servers," SMPTE Journal, Dec. 1999, pp. 873-879.

Norm Hurst and Katie Cornog, "MPEG Splicing: A New Standard for Television—SMPTE 312M," SMPTE Journal, Nov. 1998, pp. 978-988.

Norm Hurst and Katie Cornog, "Splicing FAQ," http://www.mpeg.org/MPEG/splicing-FAW.html, 8 pages, published at least as early as Oct. 13, 1999.

SMPTE 312M-1999, SMPTE Standard for Television, "Splice Points for MPEG-2 Transport Streams," Approved Apr. 8, 1999, The Society of Motion Picture and Television Engineers, White Plains, NY, 20 pages.

"The Shape of MPEG," DV Magazine, vol. 4, No. 12, Dec. 1996, http://livedv.com/Mag/Dec96/Contents/mpeg/mpeg.html, 5 pages, published at least as early as Oct. 13, 1999.

"A Guide to MPEG Fundamentals and Protocol Analysis (Including DVB and ATSC)," Tektronix, Inc., Beaverton, Oregon, 1997, pp. 48 pages.

Leonardo Chiariglione, "MPEG and multimedia communications," CSELT, Torino Italy, http://www.cselt.stet.it/ufv/leonardo/paper/isce96.htm, 50 pages, published at least as early as Oct. 13, 1999.

Barry G. Haskell, Atul Puri, and Arun N. Netravali, *MPEG-2 Video Coding and Compression,* Chp. 8, pp. 156-182, and "Interactive Television," Chp. 13, pp. 292-306, Digital Video: An Introduction to MPEG-2, Chapman & Hall, New York, NY, 1997.

"MPEG-2: The basics of how it works," Hewlett Packard, published at least as early as Oct. 31, 1999, 17 pages.

Anil K. Jain, *Fundamentals of Digital Image Processing,* Prentice Hall, Inc., Englewood Cliffs, New Jersey, 1989, Chapter 4: Image Sampling and Quantization and Chapter 5: Image Transforms, pp. 80-188.

"Information technology—Generic coding of moving pictures and associated audio information: Systems," International Standard, ISO/IEC 13818-1:1996(E), 136 pages.

"Information technology—Generic coding of moving pictures and associated audio information: Video," International Standard, ISO/IEC 13818-2:1996(E), 211 pages.

"Information technology—Generic coding of moving pictures and associated audio information—Part 3: Audio," International Standard, ISO/IEC 13818-3:1995(E), 118 pages.

Jerry D. Gibson, Toby Berger, Tom Lookabaugh, Dave Lindbergh, and Richard L. Baker, *Digital Compression for Multimedia: Principles and Standards,* Morgan Kaufmann Publishers, Inc., San Francisco, CA, 1998, Chapter 9: JPEG Still-Image Compression Standard, pp. 291-308, and Chapter 11: MPEG Compression, pp. 363-417.

Barry G. Haskell, Atul Puri, and Arun N. Netravali, Digital Video: An Introduction to MPEG-2, Chapman & Hall, New York, NY, 1997, pp. 1-279, 292-306, 369-421.

Nilesh V. Patel and Ishwar K. Sethi, *Compressed Video Processing for Cut Detection,* Vision and Neural Networks Laboratory, Dept. of Computer Science, Wayne State University, Detroit, MI, Oct. 1997, 26 pages.

Nilesh V. Patel and Ishwar K. Sethi, *Video Shot Detection and Characterization for Video Databases,* Vision and Neural Networks Laboratory, Dept. of Computer Science, Wayne State University, Detroit, MI, Oct. 1997, 22 pages.

Bo Shen, Ishwar K. Sethi and Vasudev Bhaskaran, *DCT Convolution and Its Application In Compressed Video Editing,* Dept., Hewlett-Packard Laboratories, Palo Alto, CA, To appear in SPIE VCDIP '97, also submitted to IEEE Trans. Cir. And Sys. For Video Tech., 11 pages.

B. Shen and I.K. Sethi, *Convolution-Based Edge Detection for Image/Video in Block DCT Domain,* Vision & Neural Networks Laboratory, Dept. of Computer Science, Wayne State University, Detroit, MI, To appear in Journal of Visual Communications and Image Representation, 19 pages.

Bo Shen and Ishwar K. Sethi, *Direct feature extraction from compressed images,* Vision and Neural Networks Laboratory, Dept. of Computer Science, Wayne State University, Detroit, MI, SPIE vol. 2670, Storage & Retrieval for Image and Video Databases IV, 1996, 12 pages.

Bo Shen and Ishwar K. Sethi, *Block-Based Manipulations On Transform-Compressed Images and Videos,* Vision and Neural Networks Laboratory, Dept. of Computer Science, Wayne State University, Detroit, MI, *To appear in Multimedia Systems,* 26 pages.

Bo Shen and Ishwar K. Sethi, *Inner-Block Operations On Compressed Images,* Vision and Neural Networks Laboratory, Dept. of Computer Science, Wayne State University, Detroit, MI, *ACM Multimedia '95, San Francisco, CA, Nov. 5-9, 1995,* 10 pages.

Alexandros Eleftheriadis and Dimitris Anastassiou, *Constrained and General Dynamic Rate Shaping of Compressed Digital Video,* Dept. of Electrical Engineering and Center for Telecommunications Research, Columbia University, New York, NY, *Proceedings, 1st International Conference on Image Processing (ICIP-94), Austin, Texas, Nov. 1994,* 5 pages.

Andrew B. Watson, Joshua A. Solomon, Albert Ahumada, and Alan Gale, *DCT Basis Function Visibility: Effects of Viewing Distance and Contrast Masking,* (1994), 11 pages, in B.E. Rogowitz (Ed.), Human Vision Visual Processing and Digital Display IV (pp. 99-108), Billington, WA SPIE.

O'Reilly Network Broadcast 2000 Brings DV Editing to Linus (Aug. 11, 2000), http://www.oreillynet.com/pub/a/network/2000/08/11/magazine/broadcase2000.html, published at least as early as Mar. 27, 2001, 3 pages; Broadcast 2000, http://heroinewarrior.com/bcast2000.php3, published at least as early as Mar. 27, 2001, 4 pages.

MPEG Wizard: MPEG Real-Time External Encoder, http://www.duplexx.com/mpgwiz.html, MPEG Wizard: MPEG Real-Time Encoder—Features and Software, http://www.duplexx.com/mpgwiz_f.html, MPEG Wizard: MPEG Real-Time Encoder—Specs & Requirements, http://www.duplexx.com/mpgwiz_r.html, published at least as early as Mar. 19, 2001, 4 pages.

Optivision MPEG-1 Encoder, http://brhma.imag.fr/Multimedia/jeudis/jeudi2/Optivision_mpeglenc.html, published at least as early as Mar. 19, 2001, 3 pages.

Adrienne Electronics Corporation—Home Page, http://www.adrielec.com/, 1 page; Functional Grouping of LTC/VITC, VTR Interface, and Video Products, http://www.adrielec.com/listing.htm, 2 pages; Adrienne Electronics Products and Price Listings Catalog, http://www.adrielec.com/shortfor.htm, 8 pages; AEC-BOX-Aug. 18, 1928 Standalone VITC and/or LTC Time Code Generator, http://www.adrielec.com/box28lit.htm, 4 pages; AEC-BOX-Aug. 18, 1928 Standalone LTC/VITC Time Code Reader, http://www.adrielec.com/box20lit.htm, 5 pages, published at least as early as Mar. 15, 2001.

National P/N CLC020—SMPTE 259M Digital Video Serializer with Integrated Cable Driver, http://www.national.com/pf/CL/CLC020.html, published at least as early as Mar. 14, 2001, 3 pages.

TE600 MPEG-2 DSNG Encoder, satellite uplink equipment, downlink, teleports, earth stations, amplifiers, antennas, http://www.usacanada.net/satellite/te600.htm, published at least as early as Mar. 14, 2001, 3 pages.

TDR600/RA, satellite uplink equipment, downlink, teleports, earth stations, amplifiers, antennas, http://www.usacanada.net/satellite/tdr600-ra.htm, published at least as early as Mar. 14, 2001, 2 pages.

TE300A MPEG-2 Encoder, satellite uplink equipment, downlink, teleports, earth stations, amplifiers, antennas, http://www.usacanada.net/satellite/te300a.htm, published at least as early as Mar. 14, 2001, 3 pages.

TE-30, satellite uplink equipment, downlink, teleports, earth stations, amplifiers, antennas, http://www.usacanada.net/satellite/te30.htm, published at least as early as Mar. 14, 2001, 3 pages.

\* cited by examiner

GENERATION OF MPEG SLOW MOTION PLAYOUT

BACKGROUND OF THE INVENTION

1. Field of the Invention

The present invention relates to processing and storage of compressed visual data, and in particular the processing and storage of compressed visual data for slow-forward playing, transmission, or editing of an MPEG data stream.

2. Background Art

It has become common practice to compress audio/visual data in order to reduce the capacity and bandwidth requirements for storage and transmission. One of the most popular audio/video compression techniques is MPEG. MPEG is an acronym for the Moving Picture Experts Group, which was set up by the International Standards Organization (ISO) to work on compression. MPEG provides a number of different variations (MPEG-1, MPEG-2, etc.) to suit different bandwidth and quality constraints. MPEG-2, for example, is especially suited to the storage and transmission of broadcast quality television programs.

For the video data, MPEG provides a high degree of compression (up to 200:1) by encoding 8×8 blocks of pixels into a set of discrete cosine transform (DCT) coefficients, quantizing and encoding the coefficients, and using motion compensation techniques to encode most video frames as predictions from or between other frames. In particular, the encoded MPEG video stream is comprised of a series of groups of pictures (GOPs), and each GOP begins with an independently encoded (intra) I frame and may include one or more following P frames and B frames. Each I frame can be decoded without information from any preceding and/or following frame. Decoding of a P frame requires information from a preceding frame in the GOP. Decoding of a B frame requires information from both a preceding and a following frame in the GOP. To minimize decoder buffer requirements, transmission orders differ from presentation orders for some frames, so that all the information of the other frames required for decoding a B frame will arrive at the decoder before the B frame.

A GOP can be "open" or "closed." A GOP is closed if no prediction is allowed from any frame in a previous GOP. In other words, there are no B or P frames that require any information outside the GOP for decoding. A GOP is open if prediction is allowed from a frame in a previous GOP. In other words, there is a B or P frame that requires information in a frame outside of the GOP for decoding. In the typical case of an open GOP, the transmission order of the GOP begins with an I frame and has at least one B frame following the I frame. In the presentation order, this B frame precedes the first I frame in the GOP, and this B frame requires, for decoding, the last frame of a preceding GOP.

In addition to the motion compensation techniques for video compression, the MPEG standard provides a generic framework for combining one or more elementary streams of digital video and audio, as well as system data, into single or multiple program transport streams (TS) which are suitable for storage or transmission. The system data includes information about synchronization, random access, management of buffers to prevent overflow and underflow, and time stamps for video frames and audio packetized elementary stream packets embedded in video and audio elementary streams as well as program description, conditional access and network related information carried in other independent elementary streams. The standard specifies the organization of the elementary streams and the transport streams, and imposes constraints to enable synchronized decoding from the audio and video decoding buffers under various conditions.

The MPEG-2 standard is documented in ISO/IEC International Standard (IS) 13818-1, "Information Technology-Generic Coding of Moving Pictures and Associated Audio Information: Systems," ISO/IEC IS 13818-2, "Information Technology-Generic Coding of Moving Pictures and Associated Audio Information: Video," and ISO/IEC IS 13818-3, "Information Technology-Generic Coding of Moving Pictures and Associated Audio Information: Audio," which are incorporated herein by reference. A concise introduction to MPEG is given in "A Guide to MPEG Fundamentals and Protocol Analysis (Including DVB and ATSC)," Tektronix Inc., 1997, incorporated herein by reference.

One application of MPEG-2 coded video is video-on-demand (VOD). In a VOD application, the video is stored in a server as MPEG-2 coded video. The server streams MPEG-2 coded video in real time to a subscriber's decoder. The subscriber may operate a remote control providing well-known classical videocassette recorder (VCR) functions including play, stop, fast-forward, fast-reverse, pause, slow-forward and slow-reverse.

Another application of MPEG-2 coded video is an MPEG-2 VCR. In an MPEG-2 VCR application, the video is stored on a digital cassette in MPEG-2 coded video format. The MPEG-2 VCR streams MPEG-2 coded video in real time to an MPEG-2 decoder. The operator may operate a control providing well-known classical VCR functions including play, stop, fast-forward, fast-reverse, pause, slow-forward and slow-reverse.

The third application of MPEG-2 coded video is an MPEG-2 based video editing station. In an MPEG-2 based video editing station, all video materials are stored in MPEG-2 coded video format on tapes or disks. The operators may compile and edit the MPEG-2 coded video in order to create a final broadcast version. One of the typical operations is to slow down the play speed of some portions of the video in order to show the details of action in the scene.

In the case of non-compressed video, the VOD server or VCR or video editing station responds to a slow-forward command by repeating n times each frame for generating an n-times slower play. In the case of I-frame only coded MPEG-2 video, the system may respond to this command by a similar operation of repeating each compressed frame. In the case of IP or IPB coded video, however, simply repeating coded frames will result in decoding errors (creating wrong images) and display order errors. In the following text, IP coded MPEG video is considered as a particular case of IPB coded video. In a wider meaning, I-frame only coded video is also a special case of IPB coded video.

In a typical implementation of the slow-forward function in the case of MPEG-2 IBP compressed video, the system contains an MPEG-2 decoder and an MPEG-2 encoder. To respond to a slow-forward command, the system should decode MPEG-2 video frames, repeat each uncompressed frame by n times and then encode the resulting sequence of frames into MPEG-2 video. This implementation, however, has some disadvantages. The implementation needs at least an MPEG-2 decoder and an MPEG-2 encoder. For real time transmission, the number of decoder/encoder pairs is proportional to the number of simultaneously served streams. This may become very expensive in terms of monetary cost and space. Moreover, each pair of decoding and re-encoding operations may accentuate encoding artifacts introducing additional picture quality degradation.

The slow-forward play function could be achieved by decoder side operations. A receiver could receive a normally coded video stream, decode it and display the decoded pictures at a slower speed. This would require a special decoder or display device. In the VOD environment, a typical set-top box does not have such function. Moreover, with the exception of a file-transfer environment, the data flow of the normally coded video stream must be reduced or periodically interrupted to account for the slow-motion display of the frames from the normally coded video. Therefore, there may be issues of synchronization between the video server or VCR or editing station and the decoder or display device.

SUMMARY OF THE INVENTION

The basic objective of the present invention is to provide a slow-forward function that delivers a valid MPEG data stream without need of an MPEG decoder and encoder. Therefore, the cost for implementing the slow-forward function is minimal, the original image quality is preserved, and the slow-forward function is achieved without need for any additional constraints on the decoder.

The present invention provides a way of modifying an MPEG-2 video stream so that any generic MPEG-2 video decoder can understand the instructions and correctly repeat each picture as required. The method can be performed entirely in the compressed video domain. The method can produce a slow-forward video stream that is fully compliant with the MPEG-2 video standard.

In accordance with a basic aspect of the invention, there is provided a method of slowing an MPEG coded video stream. The MPEG coded video stream includes groups of pictures (GOPs). Each group of pictures includes one or more I-frames and a plurality of B- or P-frames. The method includes identifying coding type of each frame in the MPEG-coded video stream, and inserting freeze frames as a predefined function of the identified coding type and as a predefined function of a desired slow down factor.

In accordance with another aspect, the invention provides a method of producing an MPEG slow-forward coded video stream from MPEG coded video data. The MPEG coded video data includes groups of pictures (GOPs). The groups of pictures include I-frames, P-frames, and B-frames. The method includes, for each frame in the MPEG coded video data, identifying coding type of the frame. For each frame identified as an I-frame or P-frame, at least one predicted freeze frame is added to the frame identified as an I-frame or P-frame to produce frames included in the MPEG slow-forward coded video stream, and the predicted freeze frame is dependent on the frame identified as an I-frame or P-frame. For each frame identified as a B-frame, at least one copy of the frame identified as a B-frame is added to the frame identified as a B-frame to produce frames included in the MPEG slow-forward coded video stream.

In accordance with yet another aspect, the invention provides an apparatus for producing an MPEG slow-forward coded video stream from MPEG coded video data. The MPEG coded video data includes groups of pictures (GOPs). Each group of pictures includes one or more I-frames and a plurality of B- or P-frames. The apparatus includes storage for containing the MPEG coded video data, and a processor coupled to the storage for receiving a stream of the MPEG coded video data from the storage. The processor is programmed for identifying coding type of each frame in the stream of MPEG-coded video data from the storage, and inserting freeze frames as a predefined function of the identified coding type and as a predefined function of a desired slow down factor.

In accordance with a final aspect, the invention provides an apparatus for producing an MPEG slow-forward coded video stream from MPEG coded video data. The MPEG coded video data includes groups of pictures (GOPs). The groups of pictures include I-frames, P-frames, and B-frames. The apparatus includes storage for containing the MPEG coded video data, and a processor coupled to the storage for receiving a stream of the MPEG coded video data from the storage. The processor is programmed for identifying coding type of each frame in the stream of the MPEG coded video data from the storage, and for each frame identified as an I-frame or P-frame, adding at least one predicted freeze frame to the frame identified as an I-frame or P-frame to produce frames included in the MPEG slow-forward coded video stream, the predicted freeze frame being dependent on the frame identified as an I-frame or P-frame, and for each frame identified as a B-frame, adding at least one copy of the frame identified as a B-frame to the frame identified as a B-frame to produce frames included in the MPEG slow-forward coded video stream.

BRIEF DESCRIPTION OF THE DRAWINGS

Other objects and advantages of the invention will become apparent upon reading the following detailed description with reference to the accompanying drawings, in which.

Figure 1:
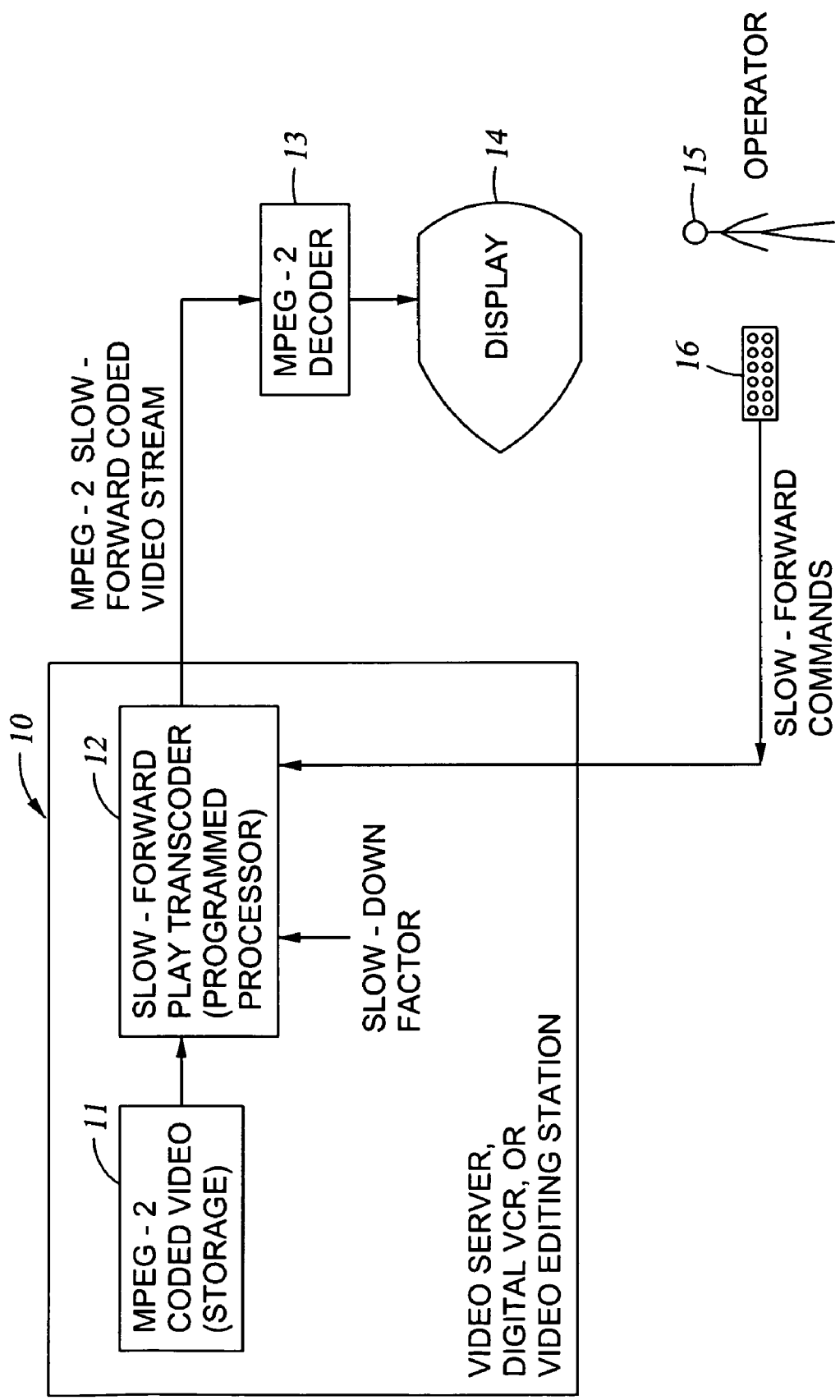
FIG. 1 is a block diagram showing the transcoding of MPEG coded video to produce an MPEG-2 slow-forward coded video stream from a video server, digital VCR, or a video editing station, for display of slow-forward video to an operator.

While the invention is susceptible to various modifications and alternative forms, specific embodiments thereof have been shown by way of example in the drawings and will be described in detail. It should be understood, however, that it is not intended to limit the form of the invention to the particular forms shown, but on the contrary, the intention is to cover all modifications, equivalents, and alternatives falling within the scope of the invention as defined by the appended claims.

DESCRIPTION OF ILLUSTRATIVE EMBODIMENTS

With reference to FIG. 1, there is shown a video server, digital VCR, or video editing station 10 incorporating the present invention. A suitable video server is described in Duso U.S. Pat. No. 5,892,915, incorporated herein by reference. MPEG-2 coded video in data storage 11 is streamed to a processor 12 programmed for real-time transcoding to produce an MPEG-2 slow-forward coded video stream. The processor 12 is responsive to a slow-down factor (n) specifying that each video frame in the original MPEG-2 coded video from the storage 11 is replicated in the MPEG-2 slow-forward coded video stream by a number of times equal to the slow-down factor (n). The MPEG-2 slow-forward coded video stream is decoded in a generic MPEG-2 decoder 13 for display on a video display 14 to an operator 15. The video frames are replicated in the MPEG-2 slow-forward coded video stream in such a way that any MPEG-2 compliant decoder can decode the slow-forward coded video stream to produce a proper sequence of replicated frames. The operator has a VCR-type remote control device 16 sending VCR-type commands, including slow-forward commands, in order to switch between normal speed play and slow-forward speed play. Usually the audio is squelched during slow-forward play, so that there is no need for processing any audio stream included in the original MPEG-2 coded video when producing the slow-forward coded video.

Figure 2:
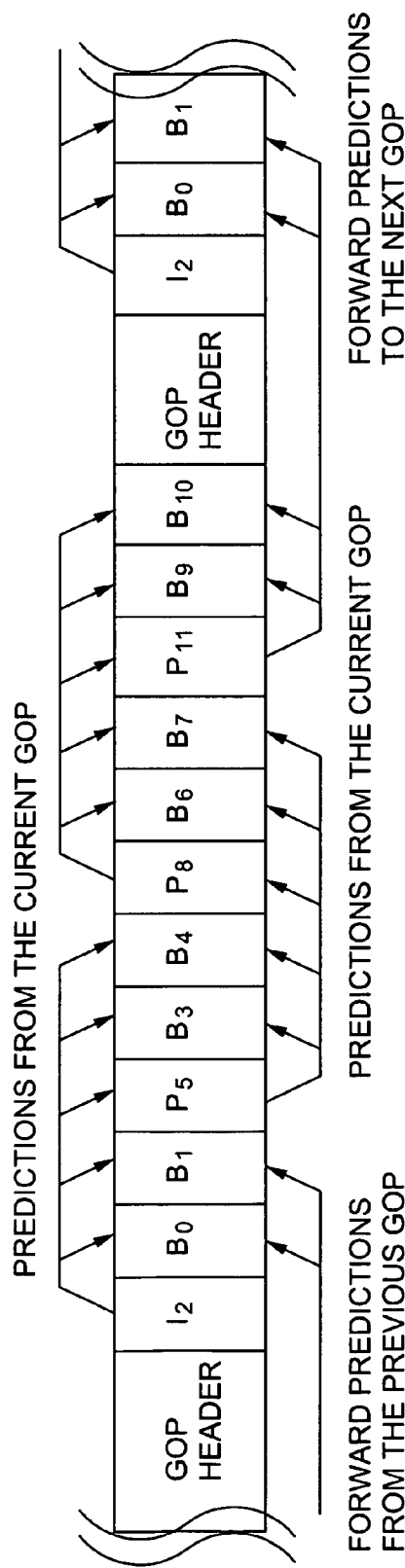
FIG. 2 shows a portion of an original MPEG-2 coded video stream in decoding order during a normal speed play.

FIG. 2 shows a series of coded pictures in decoding order in the stream of original MPEG-2 coded video during a normal speed play. The decoding order is the order in which the video data of the frames are normally stored or transmitted. FIG. 2 also shows the prediction directions between the coded pictures. I, P and B represent respectively Intra, Predictive and Bi-directionally predictive coded pictures. The subscripts indicate the temporal references for display order in the GOP. For example, $B_4$ represents the $4^{th}$ displayed image in the GOP that is encoded as Bi-directionally predicted frame. The arrows indicate the prediction directions and start with the reference frames and point to the predicted frames.

The decoding of an I-frame does not depend on other pictures. The decoding of a P-picture depends on the previously decoded I- or P-picture. The decoding of a B-picture depends on two previously decoded I- or P-pictures. If the GOP is a closed GOP, there is no need for the forward predictions from the previous GOP.

Figure 3:
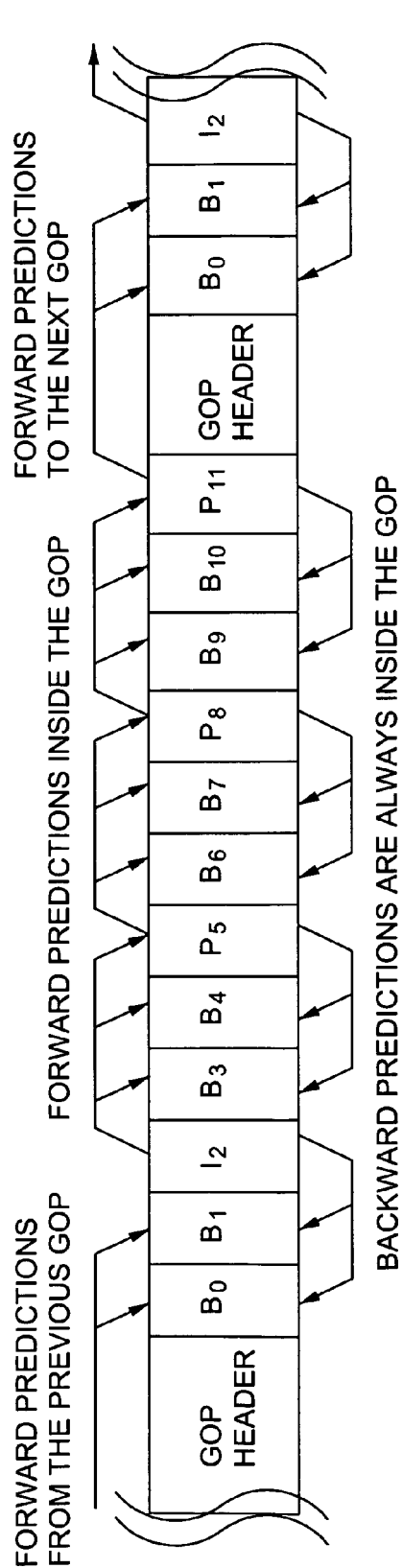
FIG. 3 shows the portion of the original MPEG-2 coded video stream of FIG. 2 but in display order.

FIG. 3 shows the same sequence as FIG. 2 but in display order. The decoding dependencies are indicated by the arrows in FIG. 3 and are summarized in Table 1 below:

TABLE I

Decoding Dependencies of the Normal Play Sequence

| Frame to decode | Extra references |
|---|---|
| $I_2$ | None |
| $B_0, B_1$ | $I_2$ in the current GOP |
| | The last reference frame in the previous GOP ($P_{11}$ in the current example) if the current GOP is open |
| $P_5$ | $I_2$ |
| $B_3, B_4$ | $I_2, P_5$ |
| $P_8$ | $P_5$ |
| $B_6, B_7$ | $P_5, P_8$ |
| $P_{11}$ | $P_8$ |
| $B_9, B_{10}$ | $P_8, P_{11}$ |

It is easy to demonstrate that simply repeating each coded picture will not result in a desired viewing effect. For example, for a three times slower speed play, if we simply repeat each coded pictures, we will have the following sequence:

$$GOP\ I_2{}^6 I_2{}^7 I_2{}^8 B_0{}^0 B_0{}^1 B_0{}^2 B_1{}^3 B_1{}^4 B_1{}^5 P_5{}^{16} P_5{}^{17} B_3{}^9 B_3{}^{11} B_4{}^{12} B_4{}^{13} B_4{}^{14}$$

Here, the superscripts indicate temporal references in the new sequences. In this case, there are some new dependencies, as listed in the following Table 2.

TABLE 2

Decoding Dependencies of a Slow-Play Sequence Generated by Simply Repeating Coded Frames

| Frame to decode | Extra references | Prediction correctness |
|---|---|---|
| $I_2{}^x$ | None | OK |
| $B_0{}^x, B_1{}^x$ | $I_2{}^8$, and $I_2{}^7$ if the current GOP is open | Prediction is wrong if the current GOP is open |
| $P_5{}^{15}$ | $I_2{}^8$ | OK |
| $P_5{}^{16}$ | $P_5{}^{15}$ | Prediction is wrong |
| $P_5{}^{17}$ | $P_5{}^{16}$ | Prediction is wrong |
| $B_3{}^x, B_4{}^x$ | $P_5{}^{16}, P_5{}^{17}$ | Prediction is wrong |
| ... | ... | ... |

It should be observed that most of the pictures cannot be correctly decoded. In fact, when decoding, the decoder always keeps the last decoded I or P picture as references for decoding other predicted pictures. Cumulated reference pictures will change the decoding dependencies, so special processing is needed.

A proposed solution for the above example is to produce the following transcoded sequence:

$$GOP\ I_2{}^8 B_0{}^0 B_0{}^1 B_0{}^2 B_1{}^3 B_1{}^4 B_1{}^5 B_{C2}{}^6 B_{C2}{}^7 P_5{}^{17} B_3{}^9 B_3{}^{10} B_3{}^{11} B_4{}^{12} B_4{}^{13} B_4{}^{14} B_{C5}{}^{15} B_{C5}{}^{16}$$

Here $B_{Ck}{}^x$ represents a full copy of the original reference picture $I_k$ or $P_k$. $B_{Ck}{}^x$ is coded as a B-picture with all macro blocks coded as backward predicted. The motion vectors and prediction errors are all zero. These frames $B_{Ck}{}^x$ are in effect freeze frames. A freeze frame may be predicted with full frame or with one of the two fields of the reference frame. This may have an affect on perceived flicker in the displayed images, as further described below.

Consider now the decoding dependencies in the proposed solution:

TABLE 3

Decoding Dependencies of the Proposed Slow-Play Sequence

| Decoding | Extra references | Prediction correctness |
|---|---|---|
| $I_2^8$ | None | OK |
| $B_0^x, B_1^x$ | $I_2^8$ in the current GOP the last reference picture in the previous GOP if the current GOP is open | OK |
| $B_{C2}^6, B_{C2}^7$ | $I_2^8$ (fully predicted by $I_2$) | OK |
| $P_5^{17}$ | $I_2^8$ | OK |
| $B_3^x, B_4^x$ | $I_2^8, P_5^{17}$ | OK |
| $B_{C5}^{15}, B_{C5}^{16}$ | $P_5^{17}$ (fully predicted by $P_5$) | OK |
| ... | ... | ... |

The decoding dependencies are all correct, even with cross-GOP dependencies. The displayed sequence will be as following:

$$GOP\ B_0^0 B_0^1 B_0^2 B_1^3 B_1^4 B_1^5 B_{C2}^6 B_{C2}^7 I_2^8 B_3^9 B_3^{10} B_3^{11} B_4^{12} B_4^{13} B_4^{14} B_{C5}^{15} B_{C5}^{16} P_5^{17}$$

In one GOP, all pictures with the same subscript shall be displayed with the same contents. So the above sequence shows that each original picture shall be really displayed 3 times.

The proposed solution introduced above can be generalized to produce properly replicated pictures in the slow-forward coded video for all original picture coding types and for open and closed GOPs. In order to display each picture n times from the slow-forward coded video, then transcoding from the original picture coding type should be done as described in the following table:

TABLE 4

Processing Rules for Generation of MPEG-2 Slow-Forward Coded Video

| Original frame | Generated frames in n times slower sequence |
|---|---|
| $I_k$ or $P_k$ | $\{B_{Ck}^{n*k+j}\}_{j=0, 1, \ldots, n-2}$ and $\{I_k^{n*(k+1)-1}$ or $P_k^{n*(k+1)-1}\}$ |
| $B_k$ | $\{B_k^{n*k+j}\}_{j=0, 1, \ldots, n-1}$ |

In Table 4, $I_k^x$, $P_k^x$ and $B_k^x$ denote the exact copy of the coded original images $I_k$, $P_k$ and $B_k$ where x is the temporal-reference in the new sequence. $B_{Ck}^x$ is a B-frame coded freeze frame that indicates to the decoder to reconstruct the frame with temporal-reference x with a full prediction by the frame $I_k$ or $P_k$.

There are also some rules for assembling the generated frames in the slow-forward coded video stream. First, the generated frames do not exceed the GOP boundary. Second, in decode order, the $B_{Ck}^x$ generated from an I- or a P-frame should be placed just after all B frames generated with the B-frames which were placed between that I- or P-frame and the next I- or P-frame (or the end of the sequence). Third, to avoid flickering effect while repeating an I- or P-frame, the freeze frame should be only predicted with the first field of the reference frame. There will, however, be some flickering effect when repeating original B-coded frames.

Figure 4:
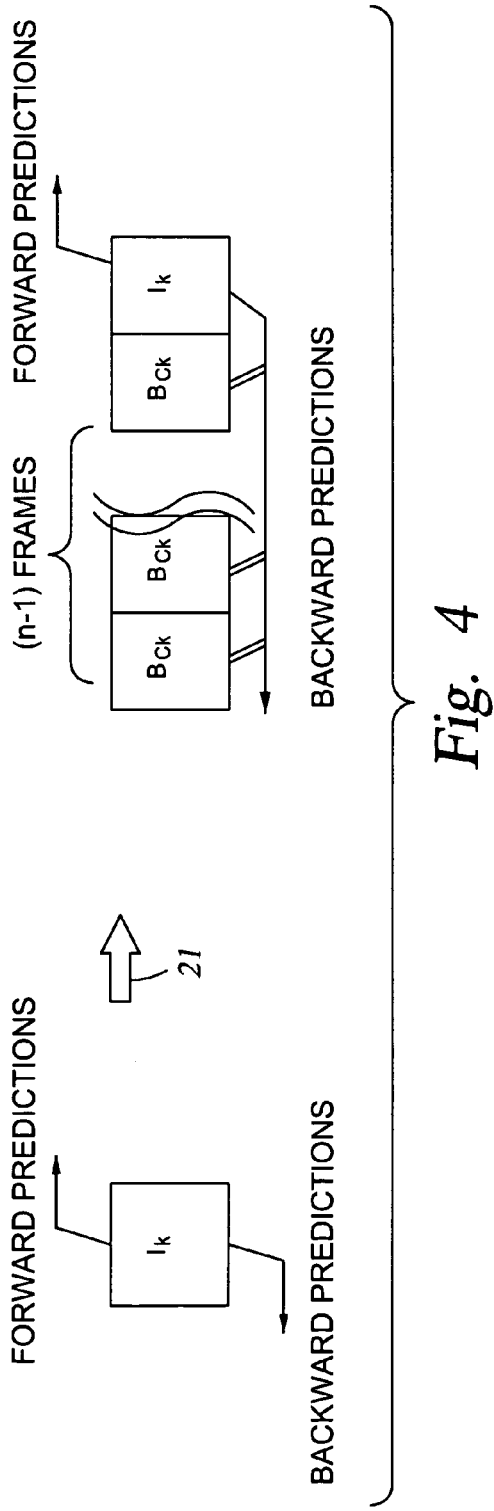
FIG. 4 shows a mapping from an I frame in the original MPEG-2 coded video stream to a sequence of corresponding frames in an MPEG-2 slow-forward coded video stream transcoded from the original MPEG-2 coded video stream.
Figure 5:
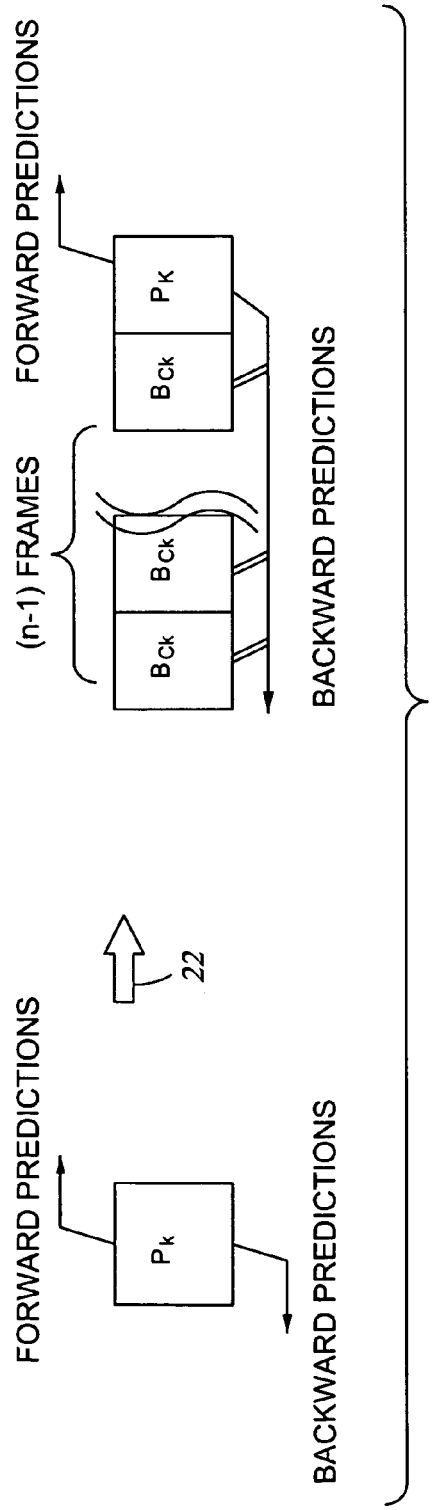
FIG. 5 shows a mapping from a P frame in the original MPEG-2 coded video stream to a sequence of corresponding frames in an MPEG-2 slow-forward coded video stream transcoded from the original MPEG-2 coded video stream.
Figure 6:
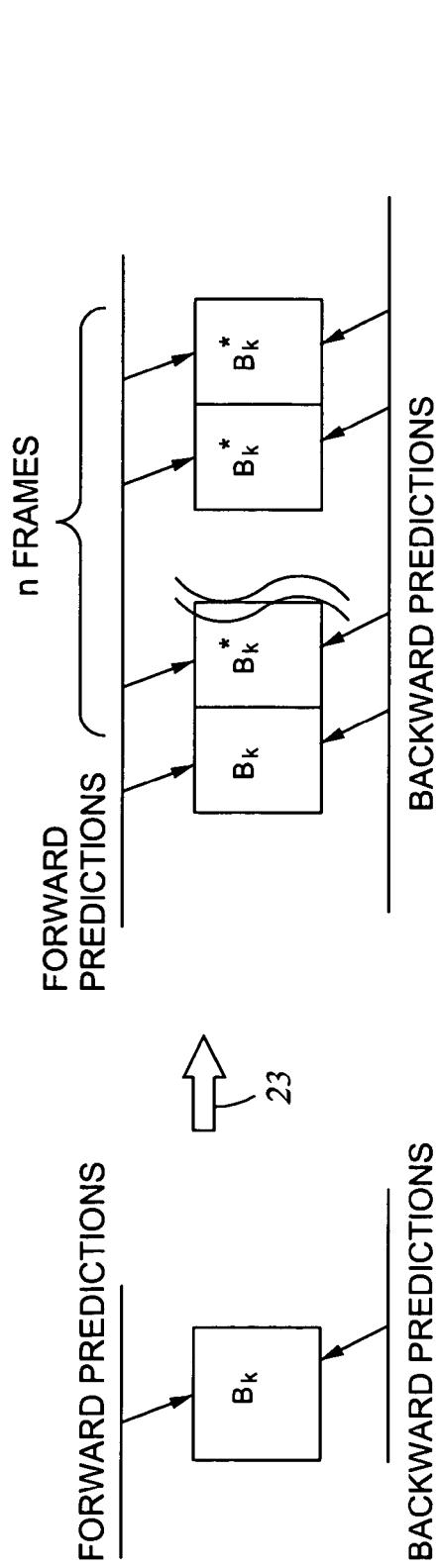
FIG. 6 shows a mapping from a B frame in an original MPEG-2 coded video stream to a sequence of corresponding frames in an MPEG-2 slow-forward coded video stream transcoded from the original MPEG-2 coded video stream.

FIGS. 4, 5, and 6 illustrate the relationships, in display order, between the original frames and the generated frames in the MPEG-2 slow-forward coded video stream. FIG. 4 shows that an I-frame $I_k$ in the original MPEG-2 coded video is transcoded as (n−1) consecutive B frames immediately followed, in display order, by a copy of the original I-frame $I_k$. In decode order, the (n−1) consecutive B frames follow the copy of the original I-frame $I_k$. The large arrow 21 represents the transcoding operation, producing the series of frames to the right of the arrow 21 from the original I-frame $I_k$ to the left of the arrow 21. The bold double lines depending from the B-frame boxes in FIG. 4 denote that the B-frame $B_{Ck}$ is a freeze frame fully predicted by the I-frame $I_k$.

Each freeze frame $B_{Ck}$, for example, is coded as a series of maximum-size slices of macroblocks, with an initial command in each slice indicating that the first macroblock is an exact copy of the corresponding macroblock in the following frame (achieved by predictive encoding with a zero valued forward motion compensation vector and no encoded prediction error), and two consequent commands indicating that the following macroblocks in the slice until and including the last macroblock of the slice are all coded in the same way as the first macroblock. The freeze frame also includes padding for video buffer verifier (VBV) management, as further described below with reference to FIGS. 10 and 11. For a constant bit rate stream, the same freeze frame $B_{Ck}$ with the same padding can be used in all cases, so that $B_{Ck}$ can be precomputed and stored in a buffer to be available whenever needed for the transcoding operation.

FIG. 5 shows that a P-frame $P_k$ is transcoded as (n−1) consecutive B-frames immediately followed, in display order, by a copy of the original P-frame $P_k$. In decode order, the (n−1) consecutive B-frames follow the copy of the original P-frame $P_k$. The large arrow 22 represents the transcoding operation. The bold double lines depending from the B-frame boxes in FIG. 4 denote that the B-frame $B_{Ck}$ is a freeze frame fully predicted by the P-frame $P_k$.

FIG. 6 shows that a B-frame is transcoded as (n) consecutive copies of the original B-frame $B_k$. However, the last (n−1) copies are designated with an asterisk to indicate that padding has been added for video buffer verifier (VBV) management, as further described below with reference to FIGS. 10 and 11. The last (n−1) copies in display order are the same as the last (n−1) copies in decoder order. The large arrow 23 represents the transcoding operation.

Figure 7:
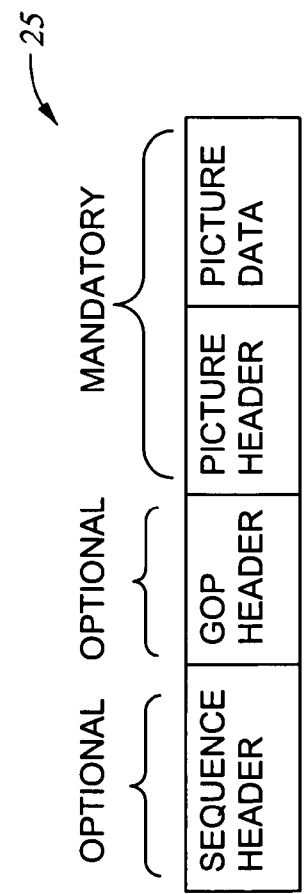
FIG. 7 shows optional and mandatory components of one MPEG-2 coded video frame.

A preferred implementation of a transcoder for producing MPEG-2 slow-forward coded video operates on a frame-by-frame basis with reference to the original MPEG-2 video elementary stream (ES). In other words, the original compressed video frames are processed one after another in the coded sequence order. As shown in FIG. 7, each coded frame 25 consists of one or more headers and picture data. The headers include a mandatory picture header as well as any optional sequence header and any optional GOP header placed immediately preceding the picture header.

Figure 8:
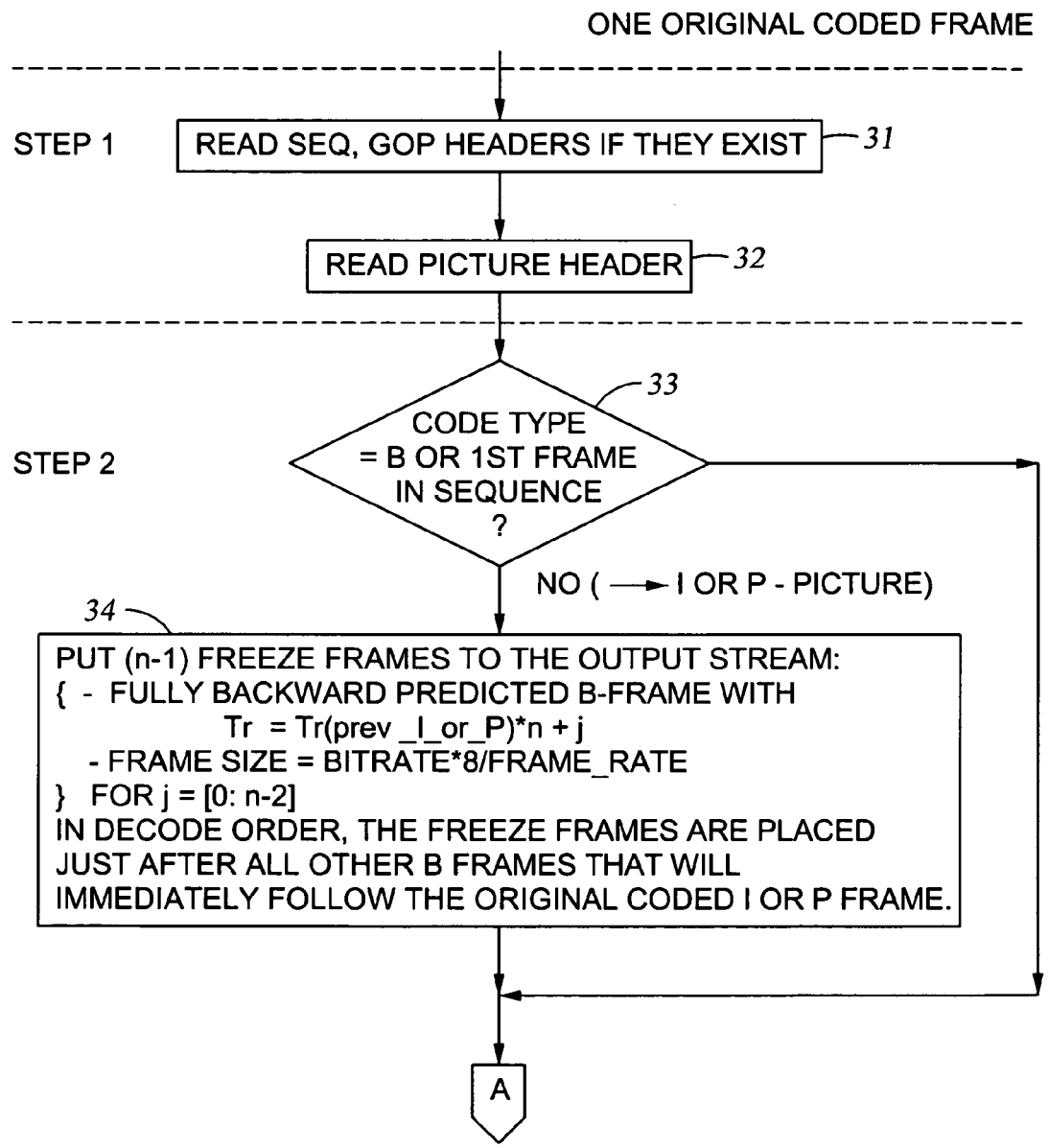
FIG. 8 is a first sheet of a flowchart showing the transcoding of one coded video frame in an original MPEG-2 coded video stream for production of a series of corresponding frames in the MPEG-2 slow-forward coded video stream.
Figure 9:
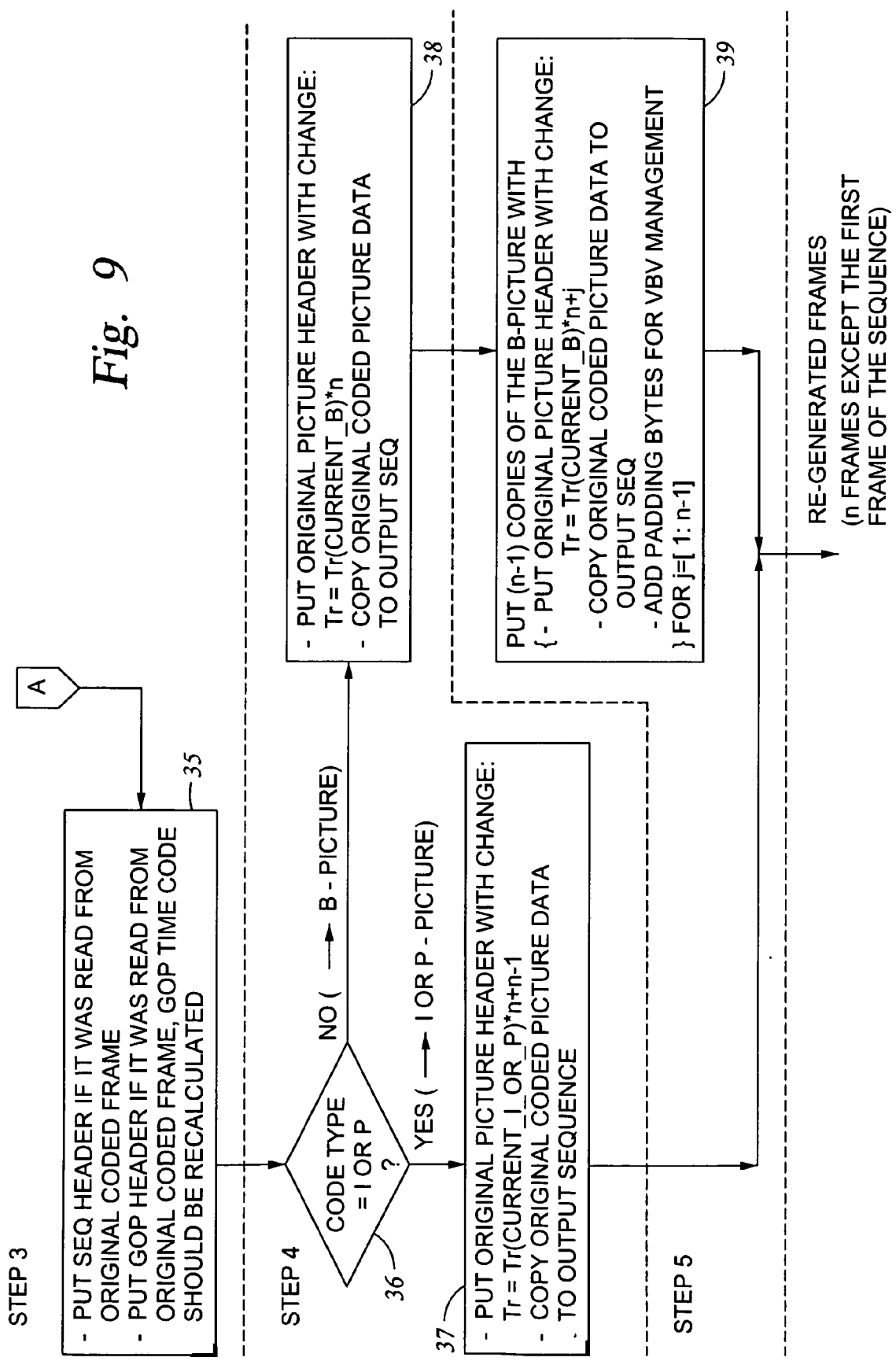
FIG. 9 is a second sheet of a flowchart begun in FIG. 8.

FIG. 8 and FIG. 9 show the processing of each video frame during the transcoding for production of the MPEG-2 slow-forward coded video stream. The slow down factor of display speed is represented by n. Each step in the flowchart of FIG. 8 and FIG. 9 is explained as follows.

The first step of the processing of one coded frame is to decode all headers of the current frame. The sequence and GOP headers are read if they exist (box 31). If the current picture starts with a sequence header, it is read and kept in memory. If the current picture has a GOP header, it is read and kept in memory. Then the picture header is read and kept in memory (box 32).

The second processing step is different according to the picture coding type of the original coded frame. If the coding type is a B-picture or if the picture is the first frame in the sequence, then execution branches (box 33) to step 3 (box 35) in FIG. 8. Otherwise, execution continues to box 34, to generate freeze frames for repeating the previous I- or P-frame (in decoding order) that is not the first picture of the sequence. In box 34, (n−1) freeze frames are put to the output stream. These (n−1) freeze frames are fully predicted by the previous I- or P-frame. The temporal reference in the picture header of each freeze frame shall be set by means of the following formula:

Temporal_reference(i)=Temporal_reference(Previous I- or P-frame)*n+j

In the above formula, j is the freeze frame index. The freeze frame index j has a value of 0 for the first added freeze frame and a value of (n−2) for the last added freeze frame. If the original bit rate is to be maintained, then each added freeze frame has a size equal to the average coded frame size of the original sequence. Padding bytes may be included in the freeze frames for this purpose.

As further indicated in box 34, in decode order, the freeze frames are placed just after all other B frames that will immediately follow the original coded I or P frame. This is in accordance with the rule introduced above, that in the decode order, the $B_{C_k}^x$ generated from an I- or a P-frame should be placed just after all B-frames generated with the B-frames which were placed between that I- or P-frame and the next I- or P-frame (or the end of the sequence). Therefore, in display order, the freeze frames will immediately precede the originally coded I- or P-frame. For example, the procedure of FIG. 8 is performed while scanning the original MPEG-2 coded video stream in decode order on a frame-by-frame basis, and the output stream is produced in decode order. In step 34 the freeze frames are placed in an intermediate buffer, and the content of the intermediate buffer is appended to the output stream when the scanning reaches the next I-frame, P-frame, or end of input of the original MPEG-2 coded video stream. Instead of using an intermediate buffer, the freeze frame generation and copying process of step 34 could be delayed until the scanning reaches the next I-frame, P-frame, or end of the input of the original MPEG-2 coded video stream. After step 2, box 34, execution continues to step 3, box 35, in FIG. 9.

In step 3, box 35, the sequence header and the GOP header if any are put to the output stream. In other words, if the current frame has a sequence header, it is rewritten to the output sequence. If the current frame has a GOP header, it is rewritten to the output sequence after updating the time code field. The new time code corresponds to that of the first presented frame of this GOP in the output sequence. From box 35, execution continues to step 4, box 36.

In step 4, the original picture header and data are put to the output stream. The entire original picture header is copied to the output stream except for the temporal reference, which is updated in accordance with the output sequence. The calculation of the new temporal reference is dependent on the picture coding type, and therefore execution branches from box 36 to box 37 for an I- or P-picture, or to box 38 for a B picture. If the frame is I- or P-picture (box 37), then the temporal reference is computed as:

Temporal_reference(new)=Temporal_reference(Currentframe)*n+n−1

If the frame is a B-picture (box 38), then the temporal reference is computed as:

Temporal_reference(new)=Temporal_reference(Current frame)*n

In either case (I, P, or B-picture, in boxes 37 or 38), the original picture data that follow the picture header is entirely copied to the output stream. For an I- or P-picture, the processing for the one original coded frame is finished upon completion of the processing in box 37. For a B-picture, execution continues to step 5, box 39.

In step 5, box 39, (n−1) freeze frames are generated for repeating the current B-frame. The freeze frames, which are copies of the coded B-frame, are written to the output stream. In addition, for each added freeze frame, the entire original picture header is copied to the output stream except for the temporal reference. The temporal reference is recomputed in accordance with the output picture sequence. The calculation of the new temporal reference is picture coding type dependent and given by the following formula:

Temporal_reference(i)=Temporal_reference(Current frame)*n+j

In the above formula, j is the freeze frame index. The freeze frame index j has a value of 1 for the first added freeze frame and a value of (n−1) for the last added freeze frame. In addition, the original B-frame picture data that follow the picture header shall be entirely copied to the output stream. Moreover, if the original bit rate is to be maintained, then padding bytes are added so that the added freeze frame has a final size equal to the average coded frame size of the original sequence for video verifier buffer (VBV) management.

Figure 10:
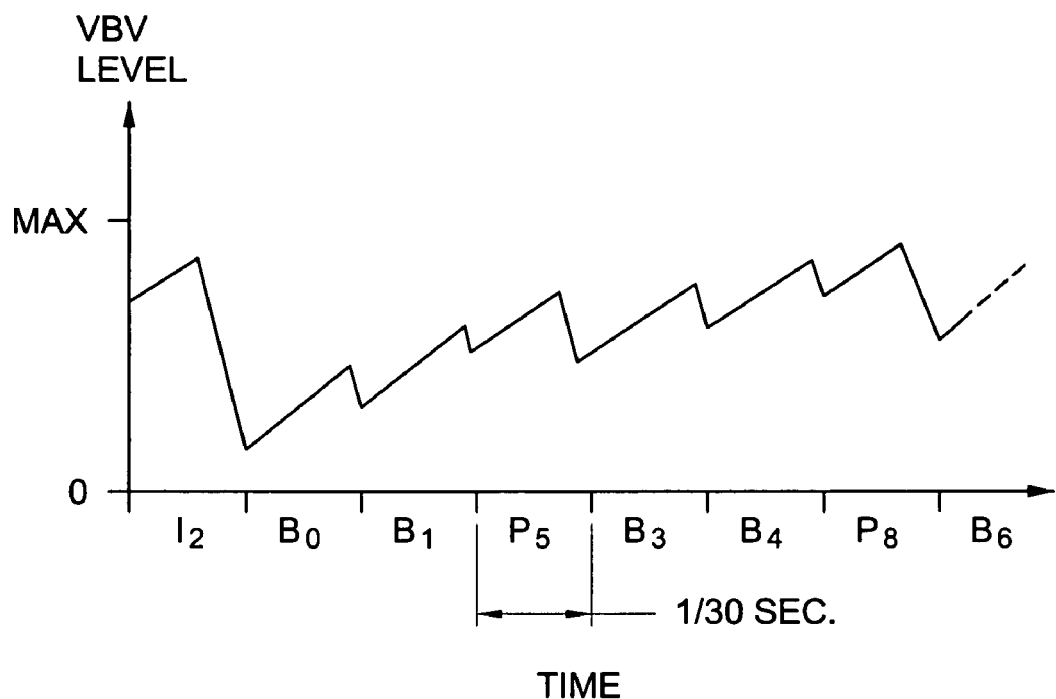
FIG. 10 is a graph of the video buffer verifier (VBV) level as a function of time during decoding of the original MPEG-2 coded video stream of FIG. 2.
Figure 11:
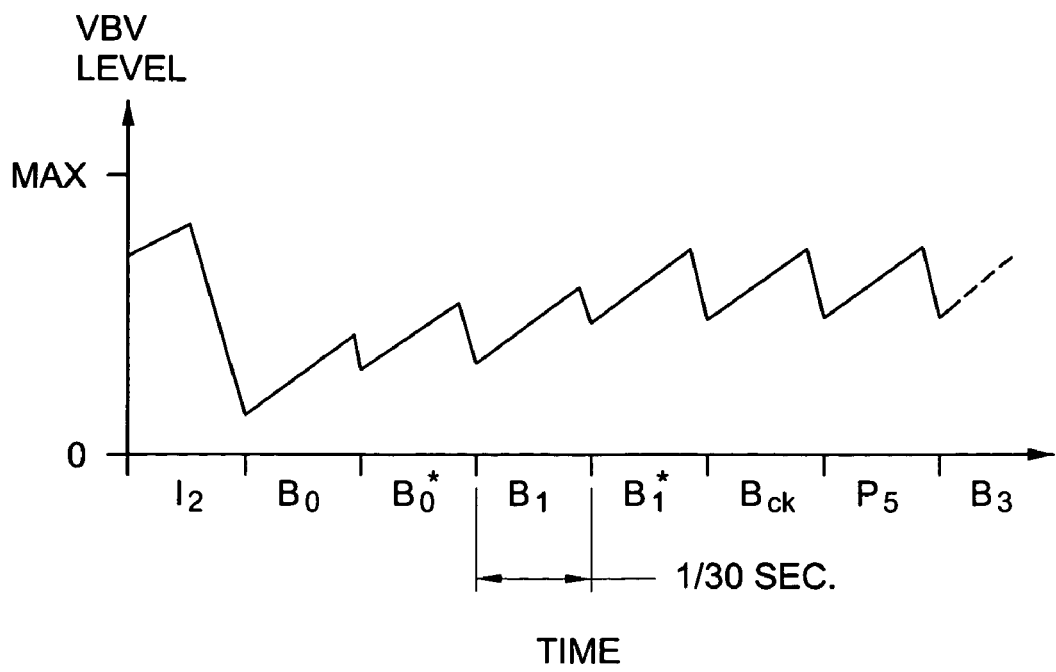
FIG. 11 is a graph of the video buffer verifier (VBV) level as a function of time during decoding of an MPEG-2 slow-coded forward video stream produced from the original MPEG-2 coded video stream of FIG. 2 using a slow-down factor of two.

As shown by comparison of FIGS. 10 and 11, VBV underflow or overflow during decoding of the slow-forward video stream can be avoided if the buffer level at the end of decoding of the freeze frame can be made the same as the buffer level at the end of decoding of the immediately following frame.

FIG. 10 shows the buffer level during decoding of the original MPEG-2 coded video of FIG. 2. FIG. 10 illustrates the general result that the VBV level reaches a local minimum when an I-frame (such as $I_2$), and when a B-frame has been decoded, the buffer level tends to have increased since the end of decoding of the previous frame.

FIG. 11 shows the buffer level during decoding of an MPEG-2 slow-forward coded video stream produced from the original MPEG-2 coded video of FIG. 2 with a slow-down factor of two. FIG. 11 illustrates that the buffer level is managed since the freeze frames ($B_{C_k}$ frames and copied $B_0^*$ frames) have additional padding so that when they are decoded, the buffer level no longer tends to rise. Instead, the buffer level at the end of decoding of each freeze frame ($B_{C_k}$ frame or copied $B_0^*$ frames) is made the same as the buffer level at the end of decoding of the immediately following frame by adding a particular number of padding bytes to each frame, depending on the original size of each frame. For the usual case of constant bit rate delivery, if the number of bits in the original freeze frame or the B-frame to be copied is denoted as FrameSizeBits, the constant bit rate is CBR in bits per second, and the frame decoding rate is 30 frames per second, then the number of padding bits to be added to the frame is given by:

PaddingBits=(CBR)(1 sec./30)−FrameSizeBits

FIG. 11 further illustrates that in the decode order, the backward-predicted freeze frame $B_{C_k}$ dependent on the I-frame $I_2$ is placed just after all other B frames ($B_0$, $B_0^*$, $B_1$, and $B_1^*$) that immediately follow the I-frame $I_2$.

Figure 12:
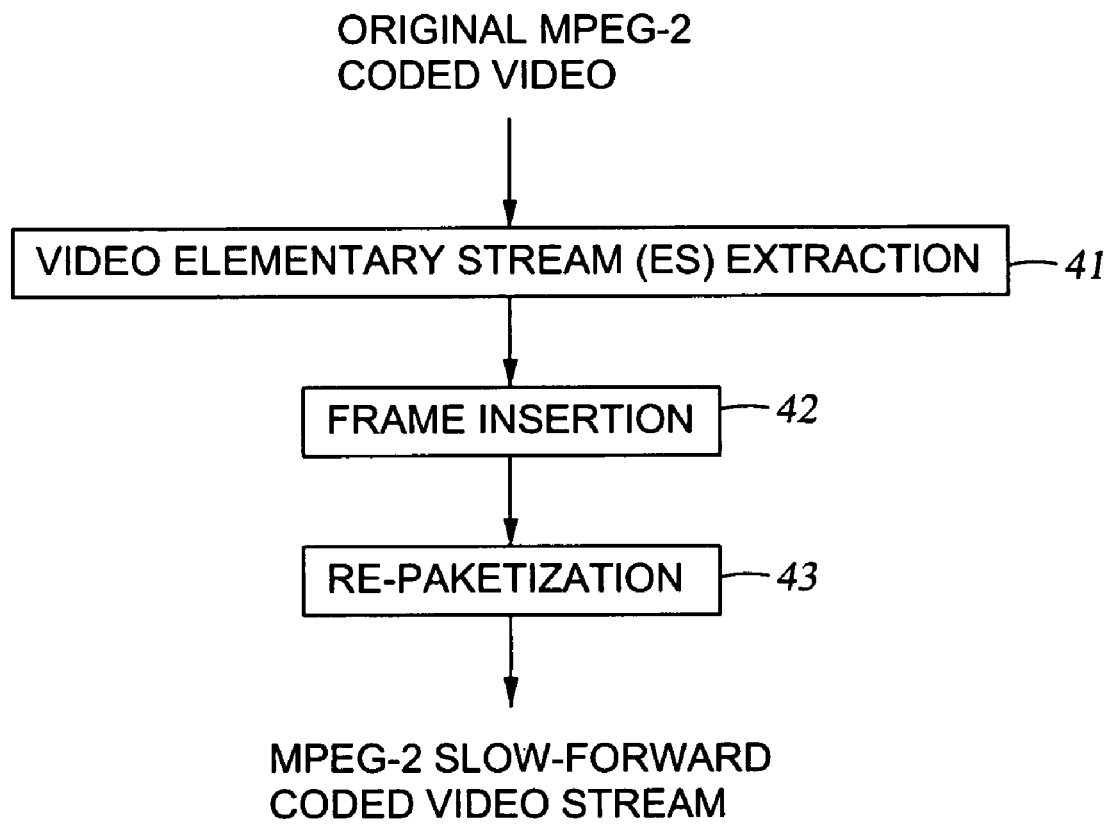
FIG. 12 is a flowchart showing how the procedure of FIGS. 8 and 9 is used in the process of producing the MPEG-2 slow-forward coded video stream from the original MPEG-2 coded video.

FIG. 12 shows a flowchart of the overall process of producing the MPEG-2 slow-forward coded video stream from the original MPEG-2 coded video. In a first step 41, the video elementary stream (ES) is extracted from the data packets of the original MPEG-2 coded video. Next, in step 42, the frame insertion procedure of FIG. 8 and FIG. 9 is performed upon each frame of the extracted video ES to produce a slow-forward video ES. Finally, in step 43, the slow-forward video ES is re-packetized to produce the MPEG-2 slow-forward coded video stream. In view of these operations, it should be apparent that the production of the MPEG-2 slow-forward coded video includes basic operations of headers searching and identification, picture type identification, modification of time codes, and copying data from the original MPEG-2 coded video stream or from a freeze frame buffer containing the pre-generated freeze frame $B_{C_k}$ to an output buffer for the MPEG-2 slow-forward coded video stream.

In view of the above, there has been described a method of providing a slow forward play of MPEG video stream from a normal compressed MPEG video elementary stream. The method can be used for both real time processing and offline processing. The method may be used in MPEG data based video servers, digital VCR players, editing stations, and broadcast stations to provide a slow play out function or special effect generation. The MPEG stream generated with the method is fully MPEG video compliant, and the visual effect is the same as the effect obtained by processing in the uncompressed video domain. The method is applicable to open and closed GOPs, and the preferred method of freeze frame generation (backward-predicted freeze frames for I and P frames) performs the same processing for open as well as closed GOPs in order to simplify and speed-up the processing operations. The method is applicable to NTSC and PAL systems, constant and variable bit rate, D1, ¾ D1, ⅔ D1 and ½ D1, SIF and Q-SIF resolutions, any GOP structures, such as I only, IP only and IPB, MPEG-1 and MPEG-2 video, and interleaved or progressive scan.

What is claimed is:

1. A method of slowing an MPEG coded video stream to produce MPEG slow-forward coded video from the MPEG coded video stream, the MPEG coded video stream including groups of pictures (GOPs), each group of pictures including one or more I-frames and a plurality of B- or P-frames, said method comprising:
   a) identifying coding type of each frame in the MPEG-coded video stream; and
   b) inserting freeze frames as a predefined function of the identified coding type and as a predefined function of a desired slow down factor, the freeze frames being inserted into the MPEG coded video stream to produce the MPEG slow-forward coded video from the MPEG coded video stream.

2. The method as claimed in claim 1, wherein the freeze frames include copies of original coded frames, and frames that are predicted frames, and the method further includes inserting into the MPEG coded video stream a selected amount of padding to obtain a normal play bit rate.

3. The method as claimed in claim 2, which includes selecting the amount of padding so that a video buffer verifier (VBV) has a level at an end of decoding said each freeze frame substantially equal to a level at an end of decoding a frame immediately preceding said each freeze frame.

4. The method as claimed in claim 2, wherein the predicted freeze frames are backward-predicted freeze frames, and the method includes placing the backward-predicted freeze frames in decode order after other B-frames immediately following an original I-frame or P-frame, and the backward-predicted freeze frames are placed in decode order just after all other B-frames that will immediately follow said original I-frame or P-frame.

5. The method as claimed in claim 1, which includes inserting, for each frame in the MPEG-coded video stream, an integer number of freeze frames into the MPEG-coded video stream, the integer number being a function of the slow-down factor.

6. A method of producing an MPEG slow-forward coded video stream from MPEG coded video data, the MPEG coded video data including groups of pictures (GOPs), the groups of pictures including I-frames, P-frames, and B-frames, said method comprising:
   for each frame in the MPEG coded video data, identifying coding type of said each frame, and
   for said each frame identified as an I-frame or P-frame, adding at least one predicted freeze frame to said each frame identified as an I-frame or P-frame to produce frames included in the MPEG slow-forward coded video stream, the predicted freeze frame being dependent on said each frame identified as an I-frame or P-frame; and
   for said each frame identified as a B-frame, adding at least one copy of said each frame identified as a B-frame to said each frame identified as a B-frame to produce frames included in the MPEG slow-forward coded video stream.

7. The method as claimed in claim 6, which includes inserting padding into the copy of said each frame identified as a B-frame to obtain a normal play bit rate.

8. The method as claimed in claim 6, which includes inserting a selected amount of padding into the copy of said each frame identified as a B-frame, the amount of padding being selected so that a video buffer verifier (VBV) has a level at an end of decoding of the copy that is substantially equal to a level at an end of decoding of a frame immediately preceding the copy.

9. The method as claimed in claim 6, wherein the predicted freeze frame is a backward-predicted freeze frame, and the method includes placing the backward-predicted freeze frame in decode order after other B-frames immediately following said each frame identified as an I-frame or P-frame, and the backward-predicted freeze frame is placed just after all other B-frames that will immediately follow said each frame identified as an I-frame or P-frame.

10. The method as claimed in claim 6, wherein the method is responsive to a variable slow down factor of n, and the method includes, for said each frame identified as an I-frame or P-frame, adding (n−1) predicted freeze frames to said each frame identified as an I-frame or P-frame to produce n frames included in the MPEG slow-forward coded video stream, and for said each frame that is identified as a B-frame, adding (n−1) copies of said each frame identified as a B-frame to said each frame identified as a B-frame to produce n frames included in the MPEG slow-forward coded video stream.

11. An apparatus for producing an MPEG slow-forward coded video stream from MPEG coded video data, the MPEG coded video data including groups of pictures (GOPs), each group of pictures including one or more I-frames and a plurality of B- or P-frames, said apparatus comprising:
   storage for containing the MPEG coded video data; and
   a processor coupled to the storage for receiving a stream of the MPEG coded video data from the storage, the processor being programmed for identifying coding type of each frame in the stream of MPEG-coded video data from the storage, and inserting freeze frames as a predefined function of the identified coding type and as a predefined function of a desired slow down factor, the freeze frames being inserted into the stream of the MPEG coded video data from the storage to produce the MPEG slow-forward coded video stream.

12. The apparatus as claimed in claim 11, wherein the freeze frames include copies of original coded frames, and frames that are predicted frames, and the processor is programmed for inserting into the stream of MPEG coded video data a selected amount of padding to obtain a normal play bit rate.

13. The apparatus as claimed in claim 12, wherein the processor is programmed for selecting the amount of padding so that a video buffer verifier (VBV) has a level at an end of decoding said each freeze frame substantially equal to a level at an end of decoding a frame immediately preceding said each freeze frame.

14. The apparatus as claimed in claim 12, wherein the predicted freeze frames are backward-predicted freeze frames, and the processor is programmed for placing the backward-predicted freeze frames in decode order after other B-frames immediately following an original I-frame or P-frame, and the backward-predicted freeze frames are placed in decode order just after all other B-frames that will immediately follow said original I-frame or P-frame.

15. The apparatus as claimed in claim 11, wherein the processor is programmed for inserting, for each frame in the MPEG-coded video stream, an integer number of freeze frames into the stream of MPEG-coded video data, the integer number being a function of the slow-down factor.

16. An apparatus for producing an MPEG slow-forward coded video stream from MPEG coded video data, the MPEG coded video data including groups of pictures (GOPs), the groups of pictures including I-frames, P-frames, and B-frames, said apparatus comprising:
  storage for containing the MPEG coded video data; and
  a processor coupled to the storage for receiving a stream of the MPEG coded video data from the storage, the processor being programmed for identifying coding type of each frame in the stream of the MPEG coded video data from the storage, and
  for said each frame identified as an I-frame or P-frame, adding at least one predicted freeze frame to said each frame identified as an I-frame or P-frame to produce frames included in the MPEG slow-forward coded video stream, the predicted freeze frame being dependent on said each frame identified as an I-frame or P-frame; and
  for said each frame identified as a B-frame, adding at least one copy of said each frame identified as a B-frame to said each frame identified as a B-frame to produce frames included in the MPEG slow-forward coded video stream.

17. The apparatus as claimed in claim 16, wherein the processor is programmed for inserting padding into the copy of said each frame identified as a B-frame to obtain a normal play bit rate.

18. The apparatus as claimed in claim 16, wherein the processor is programmed for inserting a selected amount of padding into the copy of said each frame identified as a B-frame, the amount of padding being selected so that a video buffer verifier (VBV) has a level at an end of decoding of the copy that is substantially equal to a level at an end of decoding of a frame immediately preceding the copy.

19. The apparatus as claimed in claim 16, wherein the predicted freeze frame is a backward-predicted freeze frame, and the processor is programmed for placing the backward-predicted freeze frame in decode order after other B-frames immediately following said each frame identified as an I-frame or P-frame, and the backward-predicted freeze frame is placed just after all other B-frames that will immediately follow said each frame identified as an I-frame or P-frame.

20. The apparatus as claimed in claim 16, wherein the processor is responsive to a variable slow down factor of n, and the processor is programmed for adding, for said each frame identified as an I-frame or P-frame, (n−1) predicted freeze frames to said each frame identified as an I-frame or P-frame to produce n frames included in the MPEG slow-forward coded video stream, and for said each frame that is identified as a B-frame, adding (n−1) copies of said each frame identified as a B-frame to said each frame identified as a B-frame to produce n frames included in the MPEG slow-forward coded video stream.

* * * * *